United States Patent
Tagra et al.

(10) Patent No.: US 11,611,554 B2
(45) Date of Patent: Mar. 21, 2023

(54) SYSTEM AND METHOD FOR ASSESSING AUTHENTICITY OF A COMMUNICATION

(71) Applicant: HCL Technologies Limited, New Delhi (IN)

(72) Inventors: Himanshu Tagra, Noida (IN); Gaurav Vrati, Noida (IN); Sanjay Yadav, Noida (IN); Anubhav Agarwal, Noida (IN)

(73) Assignee: HCL Technologies Limited, New Delhi (IN)

( * ) Notice: Subject to any disclaimer, the term of this patent is extended or adjusted under 35 U.S.C. 154(b) by 227 days.

(21) Appl. No.: 17/030,095

(22) Filed: Sep. 23, 2020

(65) Prior Publication Data

US 2021/0385212 A1    Dec. 9, 2021

(30) Foreign Application Priority Data

Jun. 8, 2020    (IN) .............................. 202011024060

(51) Int. Cl.
*G06V 40/20* (2022.01)
*G06V 40/40* (2022.01)
*G10L 17/00* (2013.01)
*H04L 9/40* (2022.01)
*G06N 20/00* (2019.01)
*G06F 21/64* (2013.01)

(52) U.S. Cl.
CPC .......... *H04L 63/0861* (2013.01); *G06F 21/64* (2013.01); *G06N 20/00* (2019.01)

(58) Field of Classification Search
CPC ................. H04L 63/0861; G06F 21/64; G06F 2221/2133; G06N 20/00; G06V 40/20; G06V 40/40; G10L 17/00
See application file for complete search history.

(56) References Cited

U.S. PATENT DOCUMENTS

| 10,423,773 B1* | 9/2019 | Huang ................. G06N 3/0454 |
| 2008/0260212 A1* | 10/2008 | Moskal ............. G06V 40/1371 382/209 |
| 2013/0266925 A1 | 10/2013 | Nunamaker, Jr. et al. |
| 2015/0269529 A1 | 9/2015 | Kyllonen et al. |
| 2016/0006730 A1* | 1/2016 | Chari ..................... G06F 21/32 726/7 |

(Continued)

FOREIGN PATENT DOCUMENTS

WO    2016019433 A1    2/2016

*Primary Examiner* — Joseph P Hirl
*Assistant Examiner* — Aayush Aryal
(74) *Attorney, Agent, or Firm* — Kendal Sheets

(57) ABSTRACT

Disclosed is a method and system for assessing the authenticity of a communication. The method comprises receiving data of the communication by the processor between one or more participants. Further, extracting one or more features by the processor from the data by using data extraction techniques. Further, comparing the one or more features by the processor with predefined threshold features stored in a feature repository. Further, generating, one or more authenticity attributes by using one or more trained Artificial Intelligence (AI) models applied over the one or more features, along with results of the comparing. Each of the one or more authenticity attributes generates a recommendation output, providing the authenticity of the communication.

24 Claims, 8 Drawing Sheets

(56) References Cited

U.S. PATENT DOCUMENTS

2017/0213190 A1\* 7/2017 Hazan ................. G10L 15/1815
2019/0130361 A1 5/2019 Hazarika
2021/0192221 A1\* 6/2021 Iyer ......................... G10L 15/22

\* cited by examiner

SYSTEM AND METHOD FOR ASSESSING AUTHENTICITY OF A COMMUNICATION

CROSS-REFERENCE TO RELATED APPLICATIONS AND PRIORITY

The present application claims priority from Indian Patent Application No. 202011024060 filed on Jun. 8, 2020, the entirety of which is hereby incorporated by reference.

TECHNICAL FIELD

The present subject matter described herein, in general, relates to a field of data authentication, and more particularly to assessment of authenticity of a communication.

BACKGROUND

Now days, technology has provided multiple channels of communication through various audio and video aids. Video based online communication has increased now a days for remote communication at all levels from beginner to expert. One such widely adopted area of video communication includes conduction of online audio-video interviews. The online video communication has massively increased the adoption of video conferencing software's such as Skype, FaceTime and Zoom to interview candidates online. Online video conferencing has benefits of saving time, cost, resources, and ease of hiring candidates. However, video based online communication also bring in onus of ensuring credibility of 'video-interview' in comparison with regular 'face-to-face' interview.

There are multiple instances reported, where a job applicant is caught faking in a video interview. In an exemplary scenario, the Interviewee's lips are not in-sync with the words spoken, the Interviewee tries to impersonate, someone else speaks while the Interviewee visible on video call simply lip-sync s, the Interviewee's gestures/reactions are not prompt, and at times doesn't match the discussion context, the Interviewee fails to react spontaneously to some surprise questions or jokes.

Conventionally an interviewer with prior experience of "fake interviewee" at times can detect abnormalities but many times it may be difficult to identify such candidates without technology support. A video-based interview is one-way communication where interviewee must answer series of questions and recorded video is then sent to hiring manager for review. In this offline interview evaluation process as well, major challenge is to check on authenticity of the response provided by the candidate.

SUMMARY

Before the present system and method for assessing authenticity of a communication are described, it is to be understood that this application is not limited to the particular systems, and methodologies described, as there can be multiple possible embodiments which are not expressly illustrated in the present disclosures. It is also to be understood that the terminology used in the description is for the purpose of describing the particular implementations or versions or embodiments only and is not intended to limit the scope of the present application.

This summary is provided to introduce aspects related to a system and a method for assessing authenticity of a communication. This summary is not intended to identify essential features of the claimed system and method for assessing authenticity of a communication. The subject matter nor is it intended for use in determining or limiting the scope of the claimed subject matter.

In one implementation, a system for assessing authenticity of a communication is disclosed. In one aspect, the system comprises a memory, and a processor coupled to the memory. Further, the processor may be capable of executing instructions in the memory to perform one or more steps described now. A processor is configured to receive, data of the communication between one or more participants. The data is received in a predefined mode. Further the processor extracts one or more features from the data by using data extraction techniques. Then, further the processor compares one or more features with predefined threshold features stored in a feature repository. The processor is further configured to generate one or more authenticity attributes by using one or more trained Artificial Intelligence (AI) models, along with results of the comparing. Further, each of the one or more authenticity attributes generates a recommendation output, providing the authenticity of the communication.

In another implementation, a method for assessing authenticity of a communication is disclosed. The method comprises receiving data of the communication between one or more participants. The data is received in a predefined mode. Further it comprises extracting, one or more features from the data by using data extraction techniques. Further, comparing, the one or more features with predefined threshold features stored in a feature repository. Further, generating, one or more authenticity attributes by using one or more trained Artificial Intelligence (AI) models, along with results of the comparing, wherein each of the one or more authenticity attributes generates a recommendation output, providing the authenticity of the communication.

BRIEF DESCRIPTION OF THE DRAWINGS

The foregoing detailed description of embodiments is better understood when read in conjunction with the appended drawings. For the purpose of illustrating of the present subject matter, an example of construction of the present subject matter is provided as figures; however, the invention is not limited to the specific method and system disclosed in the document and the figures.

The present subject matter is described in detail with reference to the accompanying figures. In the figures, the left-most digit(s) of a reference number identifies the figure in which the reference number first appears. The same numbers are used throughout the drawings to refer various features of the present subject matter.

DETAILED DESCRIPTION

Some embodiments of this disclosure, illustrating all its features, will now be discussed in detail. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise. Although any systems and methods for assessing authenticity of a communication similar or equivalent to those described herein can be used in the practice or testing of embodiments of the present disclosure, the exemplary, systems and methods for assessing authenticity of a communication are now described. The disclosed embodiments for assessing the authenticity of a communication are merely examples of the disclosure, which may be embodied in various forms.

Various modifications to the embodiment will be readily apparent to those skilled in the art and the generic principles herein may be applied to other embodiments for assessing the authenticity of a communication. However, one of ordinary skill in the art will readily recognize that the present disclosure for assessing the authenticity of the communication is not intended to be limited to the embodiments described, but is to be accorded the widest scope consistent with the principles and features described herein.

Generally, there are multiple instances reported, where a job applicant is caught faking in a video interview. In an exemplary scenario, the Interviewee's lips are not in-sync with the words spoken, the Interviewee tries to impersonate, someone else speaks while the Interviewee visible on video call simply lip-syncs, the Interviewee's gestures/reactions are not prompt, and at times doesn't match the discussion context, the Interviewee fails to react spontaneously to some surprise questions or jokes. Conventionally an interviewer with prior experience of "fake interviewee" at times can detect abnormalities but many times it may be difficult to identify such candidates without technology support.

The present subject matter overcomes a problem of some of the video interview evaluation issues listed above using modern technologies, artificial intelligence, machine learning and cloud computing capabilities.

Figure 1:
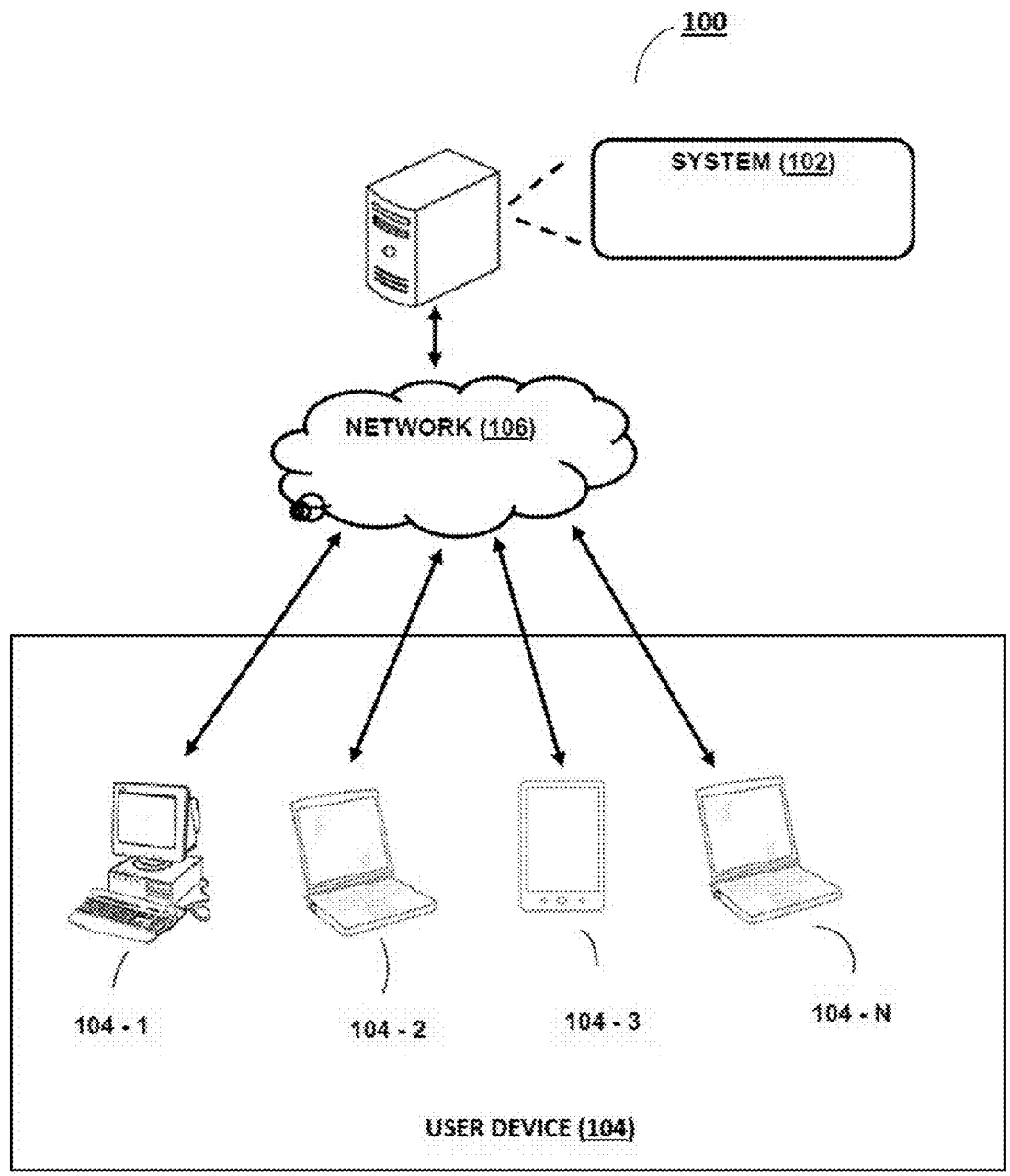
FIG. 1 illustrates a network implementation of a system for assessing authenticity of a communication, in accordance with an embodiment of the present subject matter.

Referring now to FIG. 1, a network implementation 100 of a system 102 for assessing authenticity of the communication, in accordance with an embodiment of the present subject matter may be described. In one example, the system 102 may be connected with mobile devices 104-1 through 104-N (collectively referred as 104) through a communication network 106.

It should be understood that the system 102 and the mobile devices 104 correspond to computing devices. It may be understood that the system 102 may also be implemented in a variety of computing systems, such as a laptop computer, a desktop computer, a notebook, a workstation, a mainframe computer, a server, a network server, a cloud-based computing environment, or a smart phone and the like. It may be understood that the mobile devices 104 may correspond to a variety of a variety of portable computing devices, such as a laptop computer, a desktop computer, a notebook, a smart phone, a tablet, a phablet, and the like.

In one implementation, the communication network 106 may be a wireless network, a wired network, or a combination thereof. The communication network 106 can be implemented as one of the different types of networks, such as intranet, Local Area Network (LAN), Wireless Personal Area Network (WPAN), Wireless Local Area Network (WLAN), wide area network (WAN), the internet, and the like. The communication network 106 may either be a dedicated network or a shared network. The shared network represents an association of the different types of networks that use a variety of protocols, for example, MQ Telemetry Transport (MQTT), Extensible Messaging and Presence Protocol (XMPP), Hypertext Transfer Protocol (HTTP), Transmission Control Protocol/Internet Protocol (TCP/IP), Wireless Application Protocol (WAP), and the like, to communicate with one another. Further, the communication network 106 may include a variety of network devices, including routers, bridges, servers, computing devices, storage devices, and the like.

Figure 2:
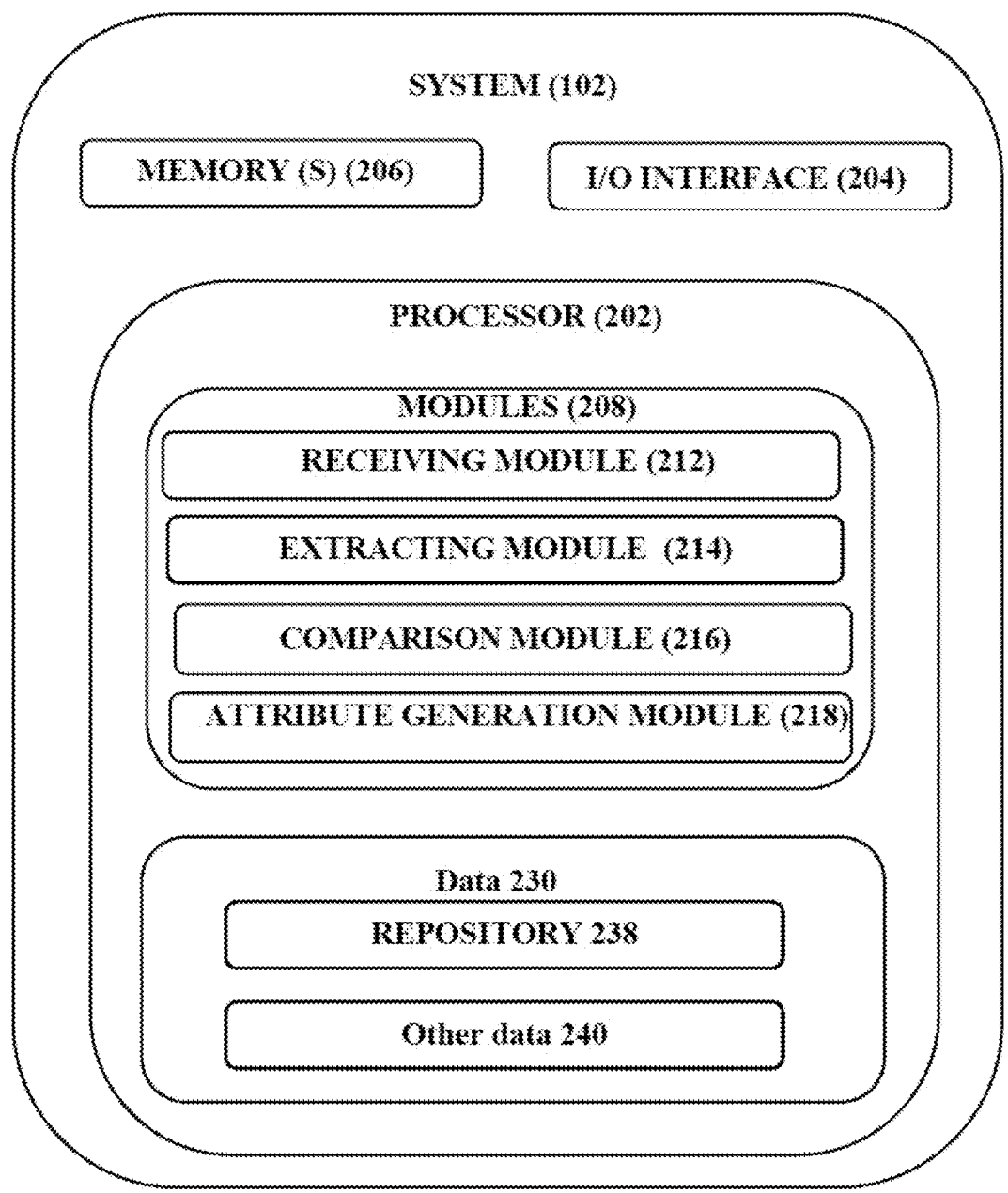
FIG. 2 illustrates a block level diagram of the system for assessing authenticity of a communication, in accordance with an embodiment of the present subject matter.

Referring now to FIG. 2, a block diagram 200 of the system 102 is illustrated in accordance with an embodiment of the present subject matter. In one embodiment, the system 102 may include at least one processor 202, an input/output (I/O) interface 204, and a memory 206. The at least one processor 202 may be implemented as one or more microprocessors, microcomputers, microcontrollers, digital signal processors, central processing units, state machines, logic circuitries, and/or any devices that manipulate signals based on operational instructions. Among other capabilities, the at least one processor 202 may be configured to fetch and execute computer-readable instructions stored in the memory 206.

The I/O interface 204 may include a variety of software and hardware interfaces, for example, a web interface, a graphical user interface, a command line interface, and the like. The I/O interface 204 may allow a user to interact with the system 102. Further, the I/O interface 204 may enable the system 102 to communicate with the mobile devices 104, and other computing devices, such as web servers and external data servers (not shown). The I/O interface 204 can facilitate multiple communications within a wide variety of networks and protocol types, including wired networks, for example, LAN, cable, etc., and wireless networks, such as WLAN, cellular, or satellite. The I/O interface 204 may include one or more ports for connecting a number of devices to one another or to another server.

The memory 206, amongst other things, serves as a repository for storing data processed, received, and generated by one or more of modules 208. The memory 206 may include any computer-readable medium or computer program product known in the art including, for example, volatile memory, such as Static Random Access Memory (SRAM) and Dynamic Random Access Memory (DRAM), and/or non-volatile memory, such as Read Only Memory (ROM), Erasable Programmable ROM (EPROM), Electrically Erasable and Programmable ROM (EEPROM), flash memories, hard disks, optical disks, and magnetic tapes.

The memory 206 may include data generated as a result of the execution of one or more of the modules 208. The memory 206 is connected to a plurality of modules 208. The system 102 comprises a receiving module 212, extracting module 214, comparison module 216, attribute generation module 218.

The data 230 may include a repository 238 for storing data processed, computed, received, and generated by one or more of the modules 208. Furthermore, the data 210 may include other data 240 for storing data generated as a result of the execution of modules than the ones mentioned above.

In one implementation, the system may be configured to assess the authenticity of a communication. The communication comprises an interview process between the one or more participants. The one or more participants comprises at least one of an interviewee and an interviewer.

The processor 202 may be configured to receive, data towards the communication between one or more participants by a receiving module 212. The data received in the processor 202 may be received as the data in the predefined mode. The predefined mode comprises at least one of a video mode, and an audio-video mode. The data may be received as one of a real time data or an offline data. The data also comprises at least one of an audio response of an interviewee provided to an interviewer, an audio-video response of the interviewee provided to the interviewer, profile data of the interviewee over social media, and resume of the interviewee.

The processor 202 may be configured to extract one or more features from the data by using data extraction techniques. The one or more features comprises at least one of a lip movement, facial expression, eye contact, voice tone, body language, formal conversational cues and informal conversational cues. In an exemplary embodiment, the Lip motion or the lip movement extraction may be done by first identifying the "lips" in the video frame using deep learning based trained models on human facial landmarks received as the data. The frame containing the "lips" is then passed to an image pre-processing pipeline to perform operations such as image resize, denoise, segmentation and morphological/smoothening techniques. Finally, "word and lips" pairs are created, and video frames containing "lips movements" are cropped and grouped by "word utterances".

Further the processor 202 may be configured to compare the one or more features with predefined threshold features stored in a feature repository. The feature repository comprises a data repository 238. The predefined threshold features stored in the feature repository are generated, based on historical data of pre-recorded interviews.

Further, the processor 202 may generate one or more authenticity attributes by using one or more trained Artificial Intelligence (AI) models, along with results of the comparing. Each of the one or more authenticity attributes generates a recommendation output, providing the authenticity of the communication. The one or more authenticity attributes comprises at least one of a lip-sync detection, body language monitoring, facial expressions analysis, eye contact analysis, voice tone analysis, formal conversational cues analysis and informal conversational cues analysis. the recommendation output comprises at least one of a profile verification score, a deception detection probability, and an impersonation detection percentage.

Further, the one or more trained AI models are integrated with the processor 202. The trained AI models are configured by using each of a machine learning techniques and deep learning techniques by executing algorithms. The algorithms comprise at least one of Google Bidirectional Encoder Representations and Transformers (BERT) based transfer learning algorithms, and Named Entity Based Recognition (NER) algorithms.

In an another embodiment, the one or more trained AI models comprises at least one of a behaviour model created using image input features, a semantic model created by using speech and textual data, an audio-video synchronization model created by using mage and speech input features. Further, the behaviour model may be used to generate authenticity attributes based on predictions on each of an eye contact, smile, laugh, shoulder positioning, hand gestures, and facial analysis. Furthermore, the semantic model is used to generate authenticity attributes based on each of predictions on candidate tone, speaker sentiment, linguistic analysis, disclosure analysis and check on facts in profile of a user. The audio-video synchronization model may generate the authenticity attributes based on predictions on audio-video synchronization.

In an example embodiment, during an interview process, interviewer communicates with an interviewee and authenticity of the communication between the interviewer and the interviewee is assessed by the system 102. The communication data may be assessed by the system in real time or the communication data may be recoded and then may be assessed by the system 102 in an offline mode. The communication data is the audio-video communication data between the interviewee and one or more interviewers. The interviewer asks plurality of questions from the interviewer for which the interviewee provides response. The response data is part of the communication data.

While providing the response, the lip movement of the interviewee, gesture details of the interviewee, eye contact of the interviewee with each of the interviewer is captured as part of the video and each of the lip movement of the interviewee, gesture details of the interviewee, eye contact of the interviewee with each of the interviewer is extracted from the video. The processor also extracts head movement of the interviewee when interviewee start looking from interviewer to another interviewer in a question-answer (interview) session.

Each of the features extracted is then compared with the predefined threshold features. Comparison is performed to check on each of synchronization of the lip-movement, eye contact, while providing an oral response to check if the response is provided by the interviewee only and not any other person who might be present in vicinity of the interviewee. The turning of head (head movement) is also analysed to check on active participation of the interviewee in the communication. The threshold parameters comprises recorded data on sample interviewee sessions, or historical in-person interviewee sessions. Threshold parameters further comprise sample authentic features extracted from the recorded data on sample interviewee sessions, or historical in-person interviewee sessions and used for comparison. The comparison is used to further obtain result if the amount of lip sync, body position, face gesture, eye position speech based on the comparison with the threshold parameters.

The features are further processed by the processor by using the one or more trained AI models applied over the features. The trained AI models are applied to generate authenticity attributes based on predictions on each of an eye contact, smile, laugh, shoulder positioning, hand gestures, and facial analysis. In an example, the semantic model is used to generate authenticity attributes based on each of predictions on the candidate's tone, speaker sentiment, linguistic analysis, disclosure analysis and check on facts in profile of a user. The audio-video synchronization model generates the authenticity attributes based on predictions on audio-video synchronization.

In addition to results of trained AI models, the system also uses communication data comprising profile data of the interviewee over social media and resume of the interviewee. For example, if the social media profile of the candidate is showing list of companies he has worked with and during the interview he fails to furnish correct information about his job profile with the list of companies. In another example, the system also uses resume data like project details, skill details and the communication data is then checked to assess the authenticity of candidate's skills as disclosed in the resume data.

The authenticity attributes is a collective result of each of the results of comparison of the communication data with the predefined threshold parameters, results of application of the one or more trained AI models over the features and the results obtained by checking communication with the profile details on social media, and details in resume of the candidate. Social media/profile here refers to "LinkedIn", "GitHub", "Kaggle" etc. For example, the "technical" keywords are picked up from the profile and further the keywords are matched during the conversation with the interviewee. E.g. if in the profile "Kafka" is mentioned as expertise for data streaming" and candidate during the interview mentioned "Spark Streaming" then there is a mismatch or for e g training courses certificates in the profile doesn't match with the certificates mentioned during the interview.

Figure 3:
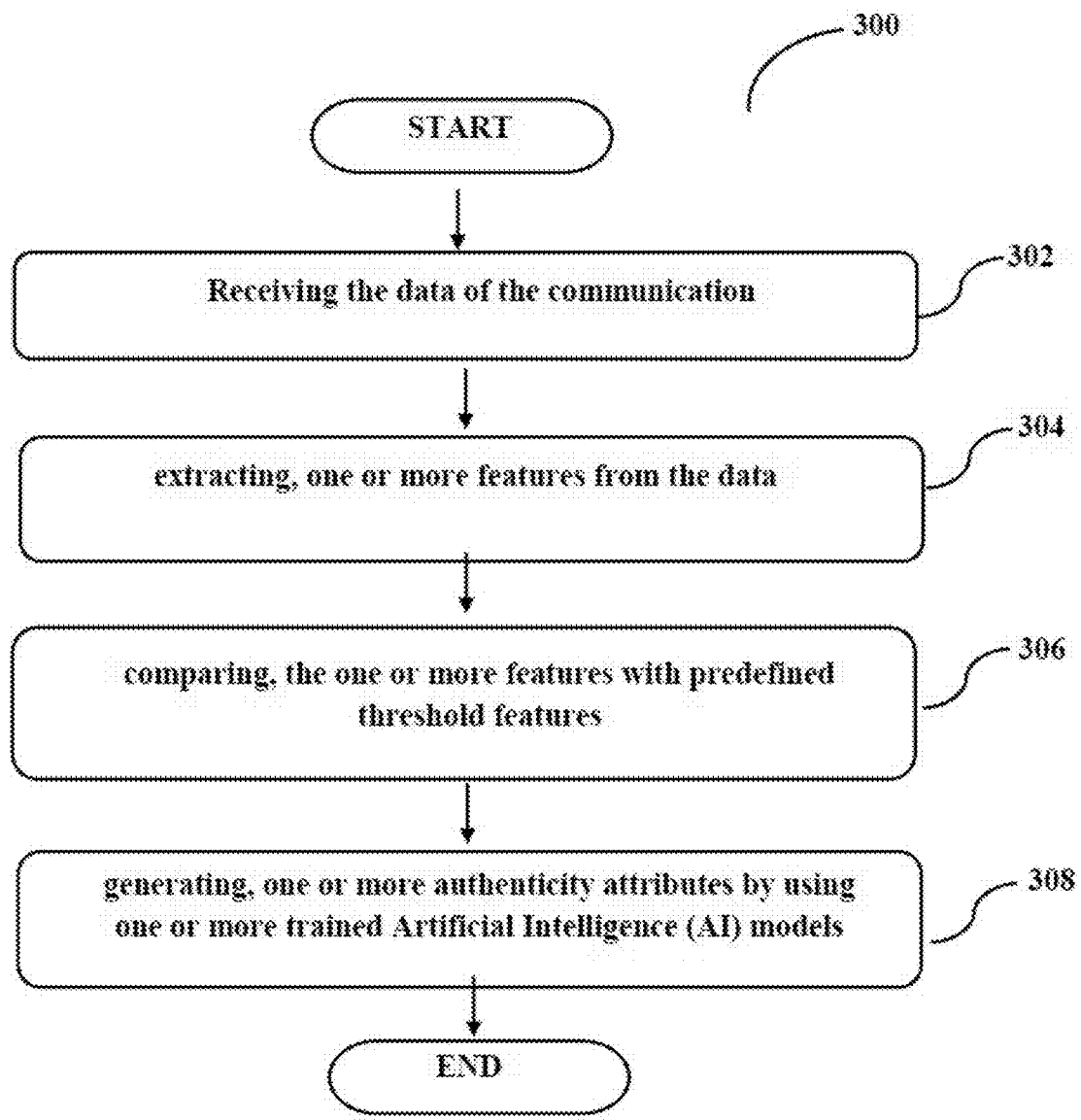
FIG. 3 illustrates a method for assessing authenticity of a communication, in accordance with an embodiment of the present subject matter.

Referring now to FIG. 3, a method 300 for assessing the authenticity of the communication is described, in accordance with an embodiment of the present subject matter. The method 300 may be described in the general context of computer executable instructions. Generally, computer executable instructions can include routines, programs, objects, components, data structures, procedures, modules, functions, etc., that perform particular functions or implement particular abstract data types.

The order in which the method 300 for assessing the authenticity of the communication is described is not intended to be construed as a limitation, and any number of the described method blocks can be combined in any order to implement the method 300 or alternate methods. Additionally, individual blocks may be deleted from the method 300 without departing from the spirit and scope of the subject matter described herein. Furthermore, the method can be implemented in any suitable hardware, software, firmware, or combination thereof. However, for ease of explanation, in the embodiments described below, the method 300 may be considered to be implemented in the above described system 102.

At block 302, the data of the communication between one or more participants is received by the receiving module 212 integrated in the processor 202. The data is received in the predefined mode. The predefined mode comprises at least one of the video modes, and the audio-video mode. The data is received as one of the real time data or the offline data. The data comprises at least one of the audio responses of the interviewee provided to an interviewer, an audio-video response of the interviewee provided to the interviewer, profile data of the interviewee over social media, and resume of the interviewee.

At block 304, extracting is done by the processor 202 through the extraction module 214. One or more features from the data are extracted by using data extraction techniques. The one or more features comprises at least one of a lip movement, facial expression, eye contact, voice tone, body language, formal conversational cues and informal conversational cues.

At block 306, comparing is done by the processor 202 through the comparison module 216. The comparison is done with the one or more features with predefined threshold features stored in a data repository 238. The predefined threshold features are generated, based on historical data of pre-recorded interviews.

At block 308, after the comparison, the processor 202 through the attribute generation module generates one or more authenticity attributes by using one or more trained Artificial Intelligence (AI) models, along with results of the comparing. Each of the one or more authenticity attributes generates a recommendation output, providing the authenticity of the communication. The recommendation output comprises at least one of a profile verification score, a deception detection probability, and an impersonation detection percentage. The one or more authenticity attributes comprises at least one of the lip-sync detection, body language monitoring, facial expressions analysis, eye contact analysis, voice tone analysis, formal conversational cues analysis and informal conversational cues analysis. The one or more trained AI models are generated by using each of a machine learning techniques and deep learning techniques by executing algorithms. The algorithms comprise at least one of Google Bidirectional Encoder Representations and Transformers (BERT) based transfer learning algorithms, and Named Entity Based Recognition (NER) algorithms.

In an embodiment, the one or more trained AI models comprises at least one of the behaviour model created using image input features, the semantic model created by using speech and textual data, the audio-video synchronization model created by using mage and speech input features. The behaviour model is used to generate authenticity attributes based on predictions on each of the eye contact, smile, laugh, shoulder positioning, hand gestures, and facial analysis. The semantic model is used to generate authenticity attributes based on each of predictions on candidate tone, speaker sentiment, linguistic analysis, disclosure analysis and check on facts in profile of a user. The audio-video synchronization model generates the authenticity attributes based on predictions on audio-video synchronization.

Figure 4:
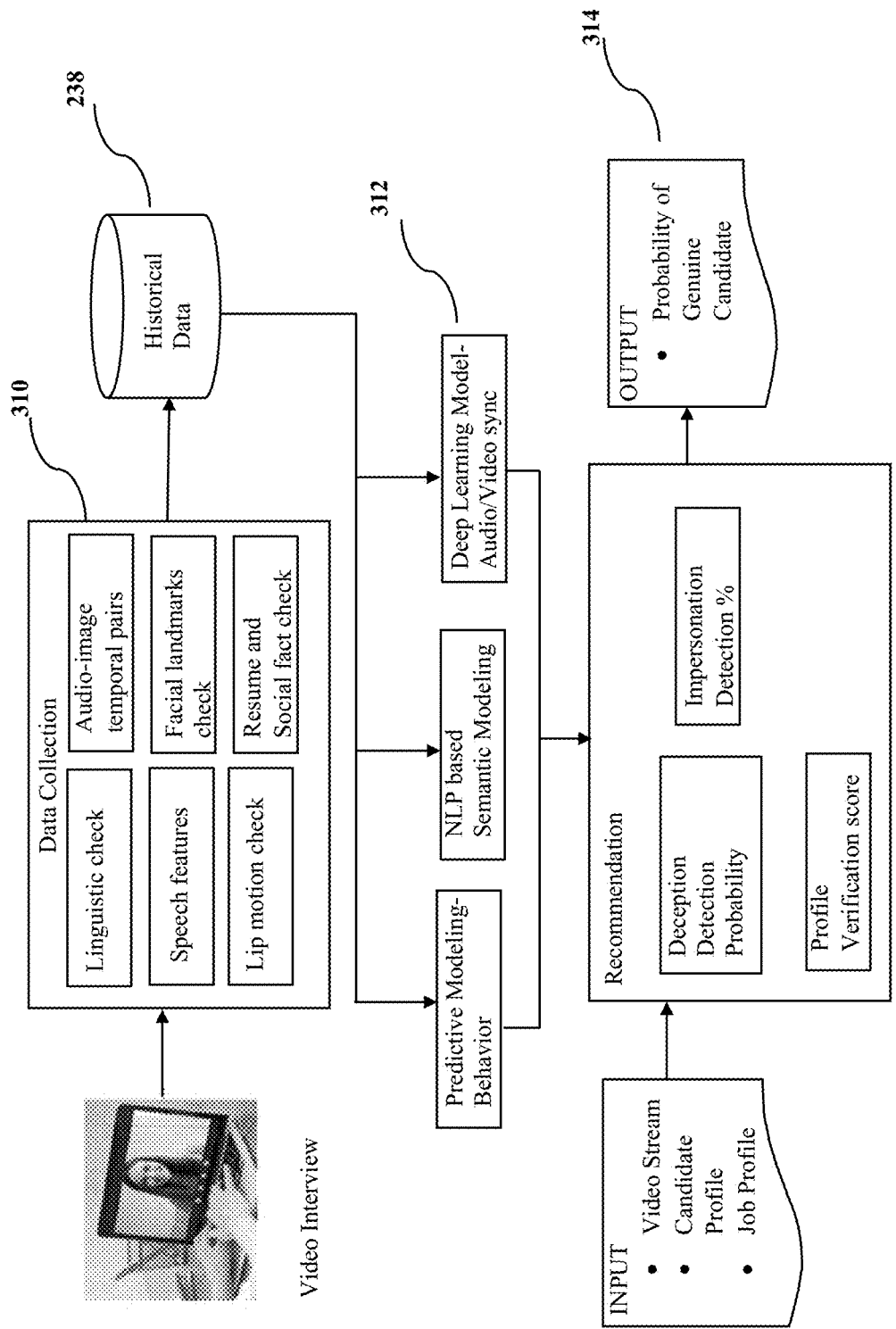
FIG. 4 illustrates a flow diagram of an exemplary embodiment of the method, in accordance with an embodiment of the present subject matter.

Referring now to FIG. 4, illustrating the flow diagram of an exemplary embodiment of the method 300, the processor may receive data of the communication between one or more participants. The data comprises at least one of an audio response of an interviewee provided to an Interviewer, an audio-video response of the interviewee provided to the interviewer, profile data of the interviewee over social media, and resume of the interviewee.

The processor 202 extracts the one or more features from the data by using data extraction techniques. One or more features from the data are extracted by using data extraction techniques 310. The one or more features comprises at least one of a lip movement, facial expression, eye contact, voice tone, body language, formal conversational cues and informal conversational cues. Further the processor 202 does comparing the one or more features with predefined threshold features stored in a data repository 238. The predefined threshold features are generated, based on historical data of pre-recorded interviews.

Further, processor generates one or more authenticity attributes by using one or more trained Artificial Intelligence (AI) models 312, along with results of the comparing, wherein each of the one or more authenticity attributes generates a recommendation output 314, providing the authenticity of the communication. Each of the one or more authenticity attributes generates a recommendation output 314, providing the authenticity of the communication. the recommendation output comprises at least one of a profile verification score, a deception detection probability, and an impersonation detection percentage.

The one or more authenticity attributes comprises at least one of the lip-sync detection, body language monitoring, facial expressions analysis, eye contact analysis, voice tone analysis, formal conversational cues analysis and informal conversational cues analysis. The one or more trained AI models are generated by using each of a machine learning techniques and deep learning techniques by executing algorithms. The algorithms comprise at least one of Google Bidirectional Encoder Representations and Transformers (BERT) based transfer learning algorithms, and Named Entity Based Recognition (NER) algorithms.

Figure 5:
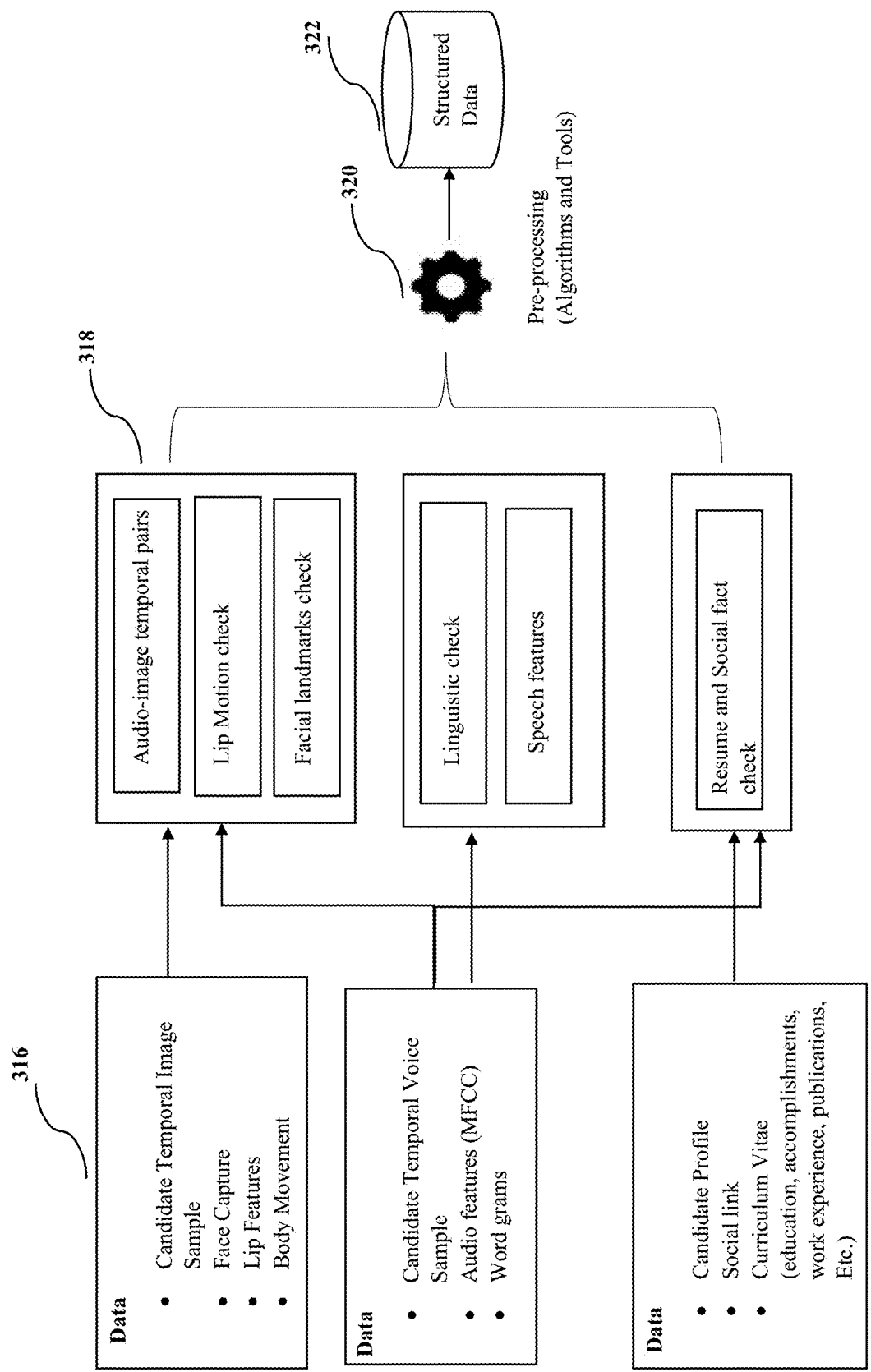
FIG. 5 illustrates a flow of receiving data associated with a communication, extraction and comparison of the one or more features for assessing communication through the method, in accordance with an embodiment of the present subject matter.

Referring now to FIG. 5, an example embodiment illustrating the method 300 illustrates the receiving data of the communication, extraction and comparison of the one or more features from the data by using data extraction techniques. The data is received in a predefined mode. The predefined mode comprises at least one of a video mode, and an audio-video mode. The data is received as one of a real time data or an offline data 316. The data 318 comprises at least one of an audio response of an interviewee provided to an interviewer, an audio-video response of the interviewee provided to the interviewer, profile data of the interviewee over social media, and resume of the interviewee. This data is pre-processed 320 and stored as a structured data 322.

Further, one or more features from the data are extracted by using data extraction techniques. The one or more features comprises at least one of a lip movement, facial expression, eye contact, voice tone, body language, formal conversational cues and informal conversational cues. Further, the comparison is done with the one or more features with predefined threshold features stored in a data repository 238. The predefined threshold features are generated, based on historical data of pre-recorded interviews.

Figure 6:
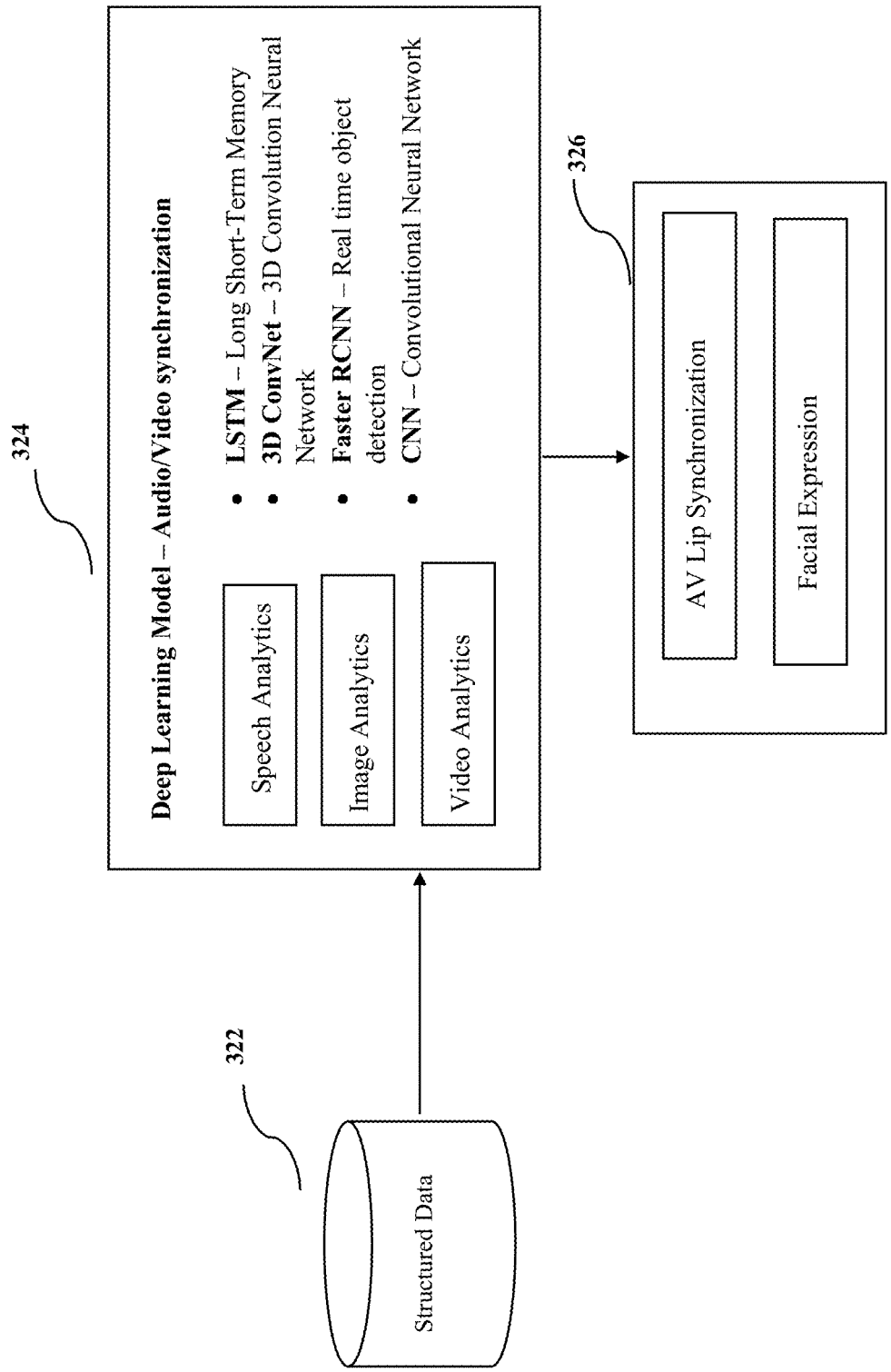
FIG. 6 illustrates, an exemplary embodiment for the method showing an Audio-Video (AV) lip synchronisation and facial expression, in accordance with an embodiment of the present subject matter.

Referring to FIG. 6, illustrates an exemplary embodiment for the method 300 showing the AV lip synchronisation and facial expression. The processor 202 generates one or more authenticity attributes by using one or more trained Artificial Intelligence (AI) models 324, along with results of the comparing. Each of the one or more authenticity attributes generates a recommendation output, providing the authenticity of the communication. Each of the one or more authenticity attributes generates a recommendation output 326, providing the authenticity of the communication. By applying video analytics, image analytics and speech analytics through artificial intelligence and deep learning techniques it produces the audio, video lip synchronisation and facial expression recommendation output.

Figure 7:
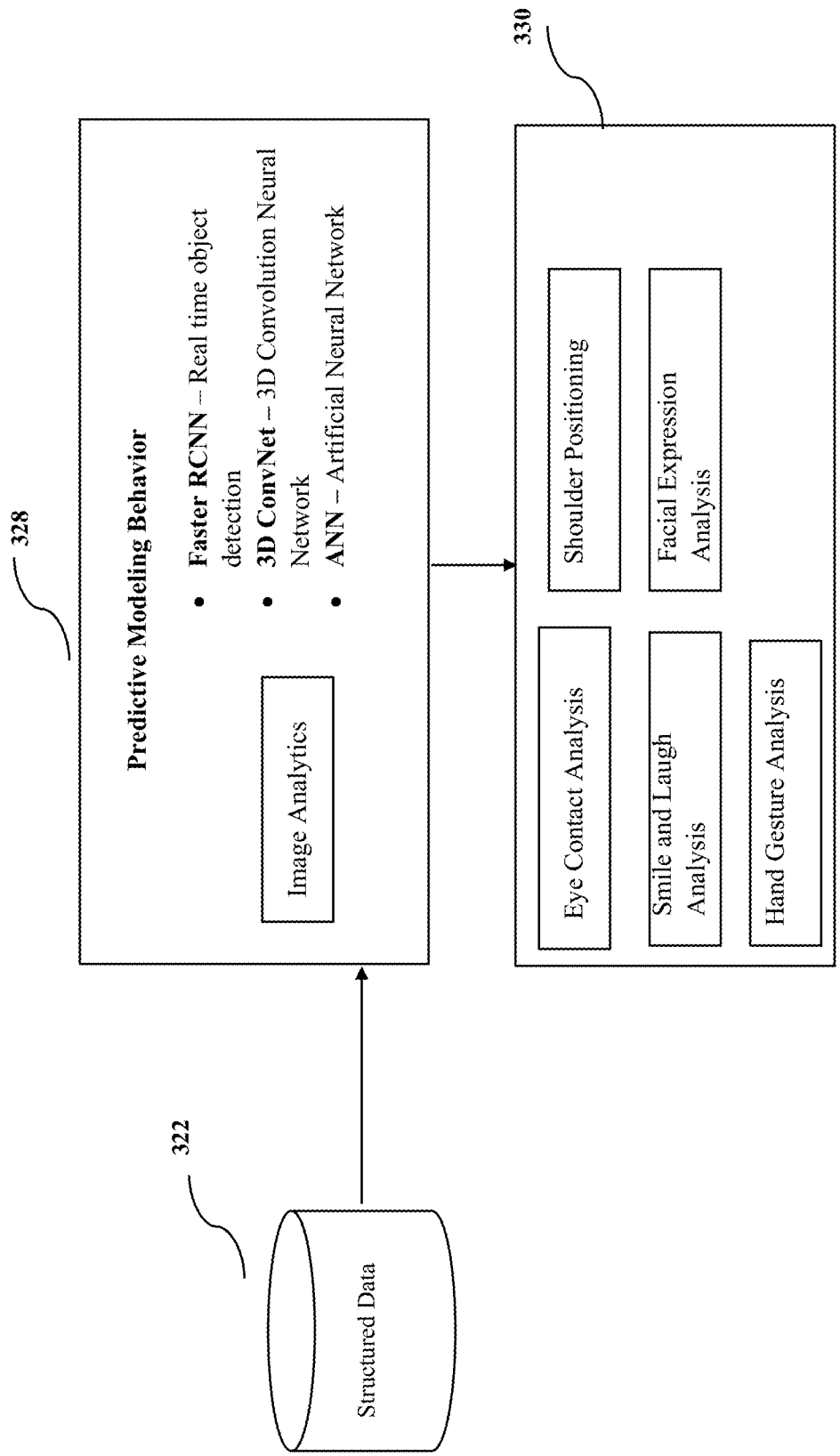
FIG. 7 illustrates a behaviour model used in the method, in accordance with an embodiment of the present subject matter.

Referring to FIG. 7, illustrates the behaviour model for the method 300. The behaviour model 328 is used to generate authenticity attributes 330 based on predictions on each of an eye contact, smile, laugh, shoulder positioning, hand gestures, and facial analysis by AI and deep learning techniques.

Figure 8:
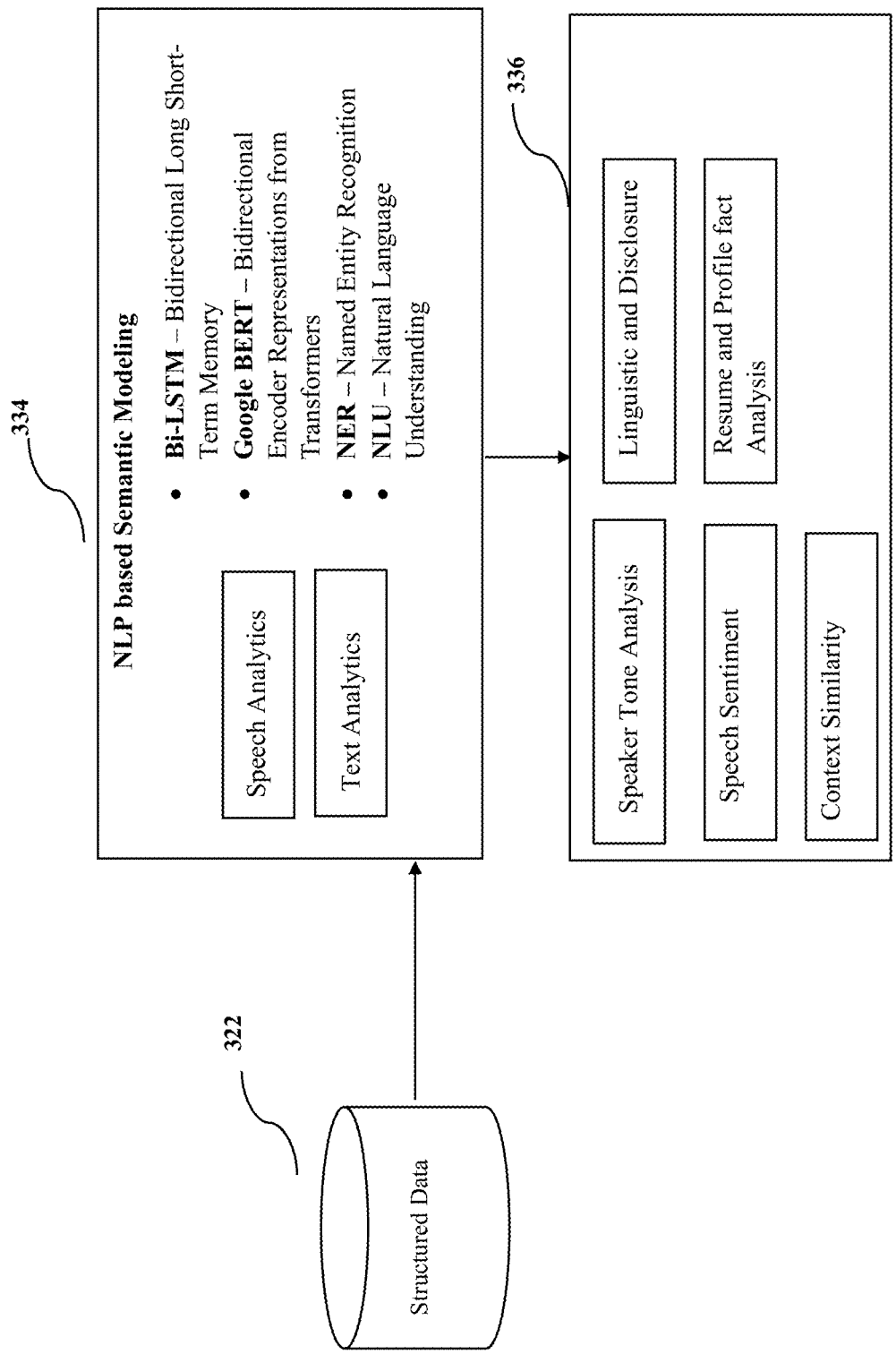
FIG. 8 illustrates the generation of authenticity attributes in the method for assessing authenticity of the communication, in accordance with an embodiment of the present subject matter

Referring to FIG. 8, illustrates the generation of authenticity attributes in the method 300. Each of the one or more authenticity attributes generates a recommendation output 336, providing the authenticity of the communication. the recommendation output comprises at least one of a profile verification score, a deception detection probability, and an impersonation detection percentage. the one or more authenticity attributes comprises at least one of a lip-sync detection, body language monitoring, facial expressions analysis, eye contact analysis, voice tone analysis, formal conversational cues analysis and informal conversational cues analysis. The one or more trained AI models are generated by using each of a machine learning techniques and deep learning techniques by executing algorithms 334. The algorithms comprise at least one of Google Bidirectional Encoder Representations and Transformers (BERT) based transfer learning algorithms, and Named Entity Based Recognition (NER) algorithms.

Although implementations for system and method for assessing the authenticity of the communication have been described in language specific to structural features and/or methods, it is to be understood that the appended claims are not necessarily limited to the specific features or methods described. Rather, the specific features and methods are disclosed as examples of implementations for assessing the authenticity of the communication.

The invention claimed is:

1. A method for assessing authenticity of a communication, the method comprising: receiving data of a communication between one or more participants, wherein
the data is received in a predefined mode;
extracting one or more features from the data by using data extraction techniques;
comparing the one or more features with predefined threshold features stored in a feature repository to thereby produce comparison results;
generating one or more authenticity attributes by using one or more trained Artificial Intelligence (AI) models applied over the one or more features, along with the comparison results, wherein each of the one or more authenticity attributes generates a recommendation output, providing the authenticity of the communication,
wherein the one or more trained AI models comprise a semantic model, and wherein the semantic model is used to generate authenticity attributes based on each of predictions on candidate tone, speaker sentiment, linguistic analysis, disclosure analysis and check on facts in profile of a user.

2. The method as claimed in claim 1, wherein the communication comprises an interview process between the one or more participants.

3. The method as claimed in claim 1, wherein the one or more participants comprises at least one of an interviewees and an interviewer.

4. The method as claimed in claim 1, wherein the data comprises at least one of an audio response of an interviewee provided to an interviewer, an audio-video response of the interviewee provided to the interviewer, profile data of the interviewee over social media, or resume of the interviewee.

5. The method as claimed in claim 1, wherein the predefined mode comprises at least one of a video modes, or an audio-video mode, wherein the data is received as one of a real time data or an offline data.

6. The method as claimed in claim 1, wherein the one or more features comprises at least one of a lip movement, facial expression, eye contact, voice tone, body language, formal conversational cues or informal conversational cues.

7. The method as claimed in claim 1, wherein the one or more authenticity attributes comprises at least one of a lip-sync detection, body language monitoring, facial expressions analysis, eye contact analysis, voice tone analysis, formal conversational cues analysis or informal conversational cues analysis.

8. The method as claimed in claim 1, wherein the predefined threshold features are generated, based on historical data of pre-recorded interviews.

9. The method as claimed in claim 1, wherein the one or more trained AI models are generated by using each of a machine learning techniques and deep learning techniques by executing algorithms, wherein the algorithms comprise at least one of Google Bidirectional Encoder Representations and Transformers (BERT) based transfer learning algorithms, or Named Entity Based Recognition (NER) algorithms.

10. The method as claimed in claim 1, wherein the one or more trained AI models comprises at least one of a behavior model created using image input features, the semantic model created by using speech and textual data, or an audio-video synchronization model created by using mage and speech input features.

11. The method as claimed in claim 10, wherein the behavior model is used to generate authenticity attributes based on predictions on each of an eye contact, smile, laugh, shoulder positioning, hand gestures, and facial analysis, and wherein the audio-video synchronization model generates the authenticity attributes based on predictions on audio-video synchronization.

12. The method as claimed in claim 1, wherein the recommendation output comprises at least one of a profile verification score, a deception detection probability, or an impersonation detection percentage.

13. A system for assessing authenticity of a communication, the system comprising:
a memory; and
a processor coupled to the memory, wherein the processor is configured to:
receive, data of the communication between one or more participants, wherein the data is received in a predefined mode;
extract, one or more features from the data by using data extraction techniques;
compare, the one or more features with predefined threshold features stored in a feature repository to thereby provide comparison results;
generate, one or more authenticity attributes by using one or more trained Artificial Intelligence (AI) models applied over the one or more features, along with the comparison results, wherein each of the one or more authenticity attributes generates a recommendation output, providing the authenticity of the communication,
wherein the one or more trained AI models comprise a semantic model, and wherein the semantic model is used to generate authenticity attributes based on each of predictions on candidate tone, speaker sentiment, linguistic analysis, disclosure analysis and check on facts in profile of a user.

14. The system as claimed in claim 13, wherein the communication comprises an interview process between the one or more participants.

15. The system as claimed in claim 13, wherein the one or more participants comprises at least one of an interviewee and an interviewer.

16. The system as claimed in claim 13, wherein the data comprises at least one of an audio response of an interviewee provided to an interviewer, an audio-video response of the interviewee provided to the interviewer, profile data of the interviewee over social media, or resume of the interviewee.

17. The system as claimed in claim 13, wherein the predefined mode comprises at least one of a video mode, or an audio-video mode, wherein the data is received as one of a real time data or an offline data.

18. The system as claimed in claim 13, wherein the one or more features comprises at least one of a lip movement, facial expression, eye contact, voice tone, body language, formal conversational cues or informal conversational cues.

19. The system as claimed in claim 13, wherein the one or more authenticity attributes comprises at least one of a lip-sync detection, body language monitoring, facial expressions analysis, eye contact analysis, voice tone analysis, formal conversational cues analysis or informal conversational cues analysis.

20. The system as claimed in claim 13, wherein the predefined threshold features are generated, based on historical data of pre-recorded interviews.

21. The system as claimed in claim 13, wherein the one or more trained AI models are generated by using each of a machine learning techniques and deep learning techniques by executing algorithms, wherein the algorithms comprise at least one of Google Bidirectional Encoder Representations and Transformers (BERT) based transfer learning algorithms, or Named Entity Based Recognition (NER) algorithms.

22. The system as claimed in claim 13, wherein the one or more trained AI models comprises at least one of a behavior model created using image input features, the semantic model created by using speech and textual data, an audio-video synchronization model created by using mage or speech input features.

23. The system as claimed in claim 13, wherein the behavior model is used to generate authenticity attributes based on predictions on each of an eye contact, smile, laugh, shoulder positioning, hand gestures, and facial analysis, and wherein the audio-video synchronization model generates the authenticity attributes based on predictions on audio-video synchronization.

24. The system as claimed in claim 13, wherein the recommendation output comprises at least one of a profile verification score, a deception detection probability, or an impersonation detection percentage.

* * * * *